(12) United States Patent
Pikin et al.

(10) Patent No.: US 9,077,774 B2
(45) Date of Patent: Jul. 7, 2015

(54) SERVER-ASSISTED VIDEO CONVERSATION

(75) Inventors: Alexey Pikin, Moscow (RU); Leanid Vouk, Palo Alto, CA (US); Nikolay Abkairov, Moscow (RU); Vijay Tella, Palo Alto, CA (US)

(73) Assignee: Skype Ireland Technologies Holdings, Dublin (IE)

( * ) Notice: Subject to any disclaimer, the term of this patent is extended or adjusted under 35 U.S.C. 154(b) by 269 days.

(21) Appl. No.: 13/152,973

(22) Filed: Jun. 3, 2011

(65) Prior Publication Data

US 2012/0140018 A1 Jun. 7, 2012

Related U.S. Application Data

(60) Provisional application No. 61/351,711, filed on Jun. 4, 2010.

(51) Int. Cl.
*H04N 7/14* (2006.01)
*H04L 29/06* (2006.01)
*H04L 29/08* (2006.01)

(52) U.S. Cl.
CPC ............ *H04L 65/4015* (2013.01); *H04N 7/147* (2013.01); *H04L 65/605* (2013.01); *H04L 65/607* (2013.01); *H04L 65/608* (2013.01);
(Continued)

(58) Field of Classification Search
CPC H04M 2203/50–2203/509; H04W 8/22–8/30; H04W 24/00–24/10; H04W 28/00–20/0294; H04W 28/10–28/26; H04W 76/04–76/048; H04L 12/26–12/2852
USPC ................... 348/14.01–14.16; 370/229–240, 370/259–271, 351–357; 709/201–207, 709/217–248; 455/412.1–426.2, 455/575.1–575.9, 90.1–90.3, 456.1–560
See application file for complete search history.

(56) References Cited

U.S. PATENT DOCUMENTS 5,475,421 A * 12/1995 Palmer et al. ................. 348/14.1
5,794,018 A * 8/1998 Vrvilo et al. ................... 713/400
(Continued)

FOREIGN PATENT DOCUMENTS

CN 101273607 9/2008
EP 1758334 A1 2/2007

OTHER PUBLICATIONS

Invitation to Pay Additional Fees and, Where Applicable, Protest Fee, PCT/US2011/039132, Mailing Date: Sep. 15, 2011, 9 pp.
(Continued)

*Primary Examiner* — Hemant Patel
(74) *Attorney, Agent, or Firm* — Sonia Cooper; Jim Ross; Micky Minhas

(57) ABSTRACT

A method, computer program product, and system provide real time, two way audio-video conversation between mobile computing devices. Low latency is achieved by splitting the audio and video data streams from a given audio-video conversation using two different transport protocols to send the separate streams over a network, and re-syncing them at the other end. The transmission for each stream is tuned based on feedback data indicating available bandwidth of the network or other mobile computing device. A server offloads processing requirements that would otherwise be handled by the mobile computing device. The two way conversation can be externally observed by web-based users. The system functions over a disparate set of mobile computing device endpoints and web-based endpoints, and over different wireless carrier network infrastructures.

36 Claims, 8 Drawing Sheets

(52) U.S. Cl.
CPC ............ *H04L 65/80* (2013.01); *H04L 67/2861* (2013.01); *H04L 69/16* (2013.01); *H04L 67/04* (2013.01); *H04L 69/18* (2013.01); *H04L 69/165* (2013.01)

(56) References Cited

U.S. PATENT DOCUMENTS

| | | | |
|---|---|---|---|
| 6,269,122 B1* | 7/2001 | Prasad et al. | 375/240.28 |
| 6,570,849 B1* | 5/2003 | Skemer et al. | 370/230.1 |
| 6,646,674 B1* | 11/2003 | Kato | 348/14.13 |
| 6,771,594 B1 | 8/2004 | Upadrasta | |
| 6,850,284 B2* | 2/2005 | Gries et al. | 348/512 |
| 6,944,136 B2* | 9/2005 | Kim et al. | 370/260 |
| 7,099,288 B1* | 8/2006 | Parker et al. | 370/259 |
| 7,283,154 B2* | 10/2007 | Shachar et al. | 348/14.08 |
| 7,561,178 B2* | 7/2009 | Baartman et al. | 348/14.08 |
| 7,664,057 B1* | 2/2010 | Wu et al. | 370/260 |
| 7,707,614 B2* | 4/2010 | Krikorian et al. | 725/94 |
| 7,720,065 B2* | 5/2010 | Liu et al. | 370/389 |
| 7,738,499 B2* | 6/2010 | Kugumiya et al. | 370/503 |
| 7,983,345 B2* | 7/2011 | Tsukagoshi et al. | 375/240.28 |
| 8,055,221 B2* | 11/2011 | Lee et al. | 455/180.1 |
| 8,571,189 B2* | 10/2013 | Yuan et al. | 379/93.08 |
| 2003/0043787 A1* | 3/2003 | Emerson, III | 370/352 |
| 2004/0179554 A1* | 9/2004 | Tsao | 370/486 |
| 2005/0021809 A1 | 1/2005 | Zhu et al. | |
| 2005/0058073 A1* | 3/2005 | Ayyagari et al. | 370/236 |
| 2005/0099492 A1* | 5/2005 | Orr | 348/14.08 |
| 2005/0281246 A1* | 12/2005 | Seo et al. | 370/350 |
| 2007/0019931 A1* | 1/2007 | Sirbu | 386/96 |
| 2007/0291106 A1* | 12/2007 | Kenrick et al. | 348/14.01 |
| 2008/0034104 A1* | 2/2008 | Kariti et al. | 709/231 |
| 2008/0062252 A1* | 3/2008 | Kawamura et al. | 348/14.09 |
| 2009/0013086 A1* | 1/2009 | Greenbaum | 709/231 |
| 2009/0154347 A1* | 6/2009 | Mamidwar et al. | 370/229 |
| 2009/0259460 A1* | 10/2009 | Jia et al. | 704/215 |
| 2009/0295992 A1* | 12/2009 | Richardson et al. | 348/515 |
| 2010/0074178 A1* | 3/2010 | Larmo et al. | 370/328 |
| 2010/0142927 A1* | 6/2010 | Lim et al. | 386/96 |
| 2010/0272030 A1* | 10/2010 | Babbar | 370/329 |
| 2010/0295993 A1* | 11/2010 | Oh | 348/516 |

OTHER PUBLICATIONS

Notification of Transmittal of the International Search Report and the Written Opinion of the International Searching Authority, or the Declaration, PCT/US2011/039132, Mailing Date: Nov. 4, 2011, 24 pp.

Frojdh, P. et al., "Adaptive Streaming within the 3GPP Packet-Switched Streaming Service", IEEE Network Mar./Apr. 2006, pp. 34-40, XP-001546775.

Schulzrinne, H., et al., RTP: A Transport Protocol for Real-Time Applications, Network Working Group, The Internet Society, pp. 1-104, Jul. 2003.

"Foreign Office Action", CN Application No. 201180027592.0, Nov. 4, 2014, 15 pages.

* cited by examiner

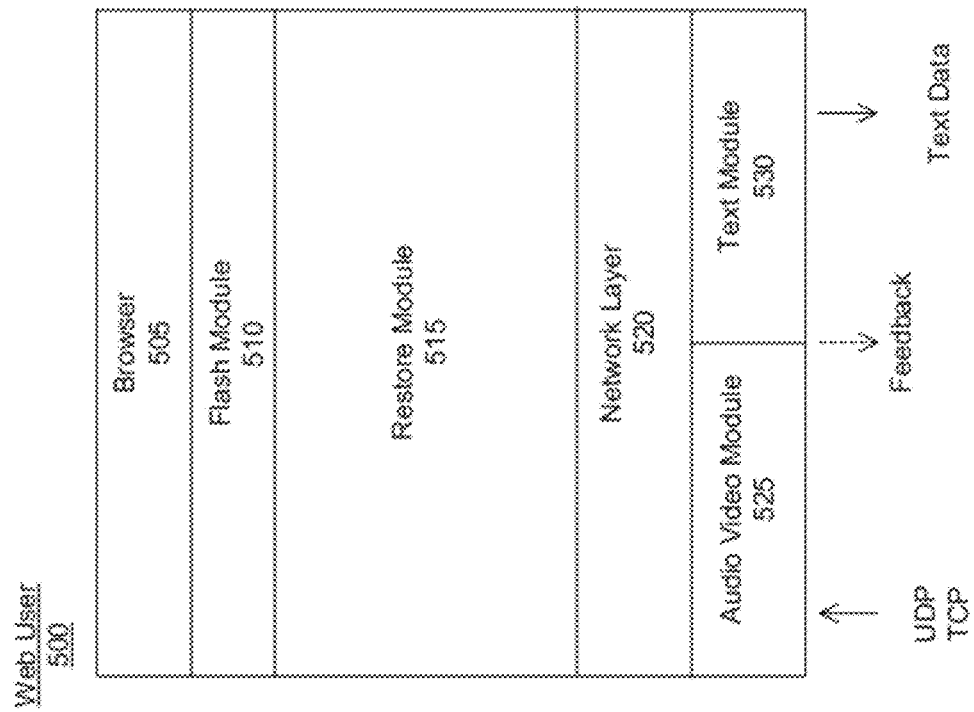
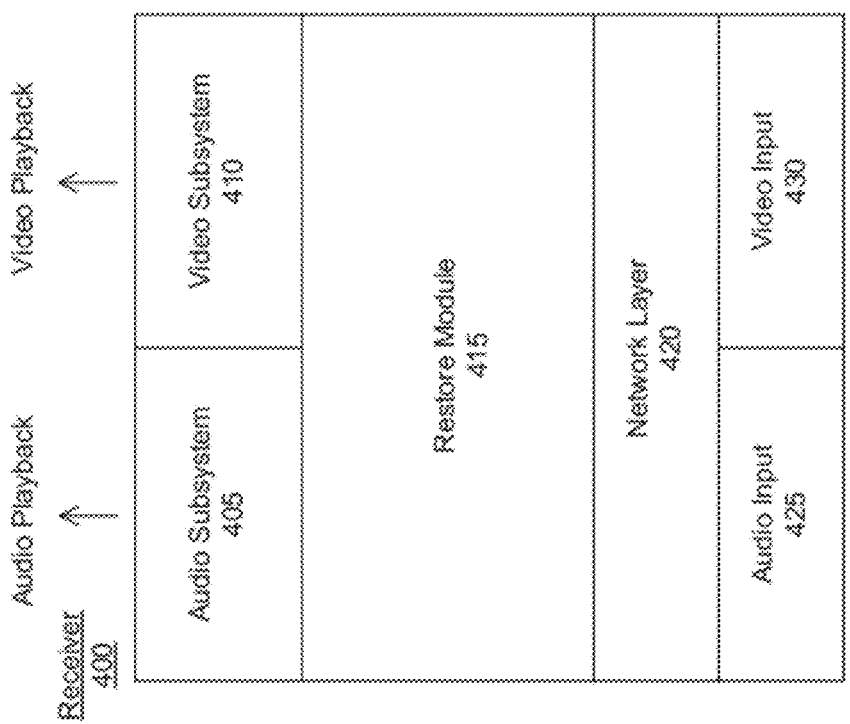

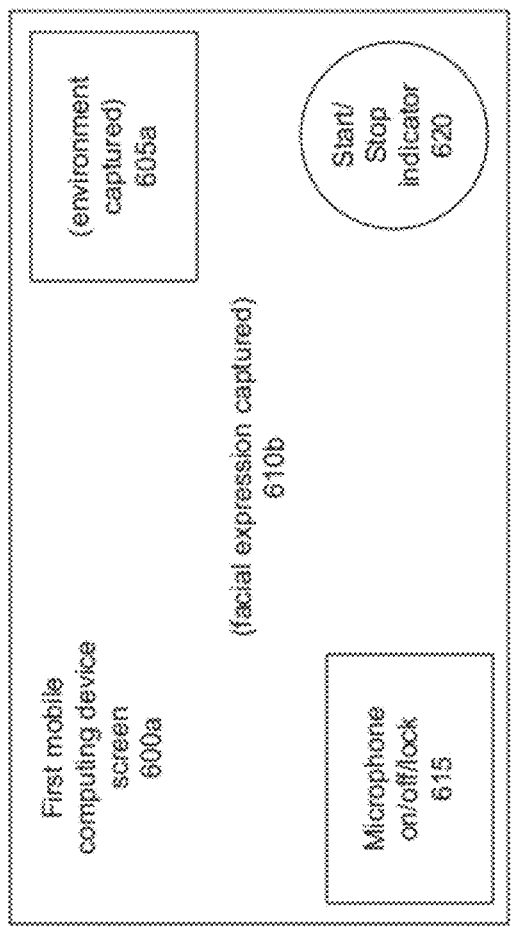
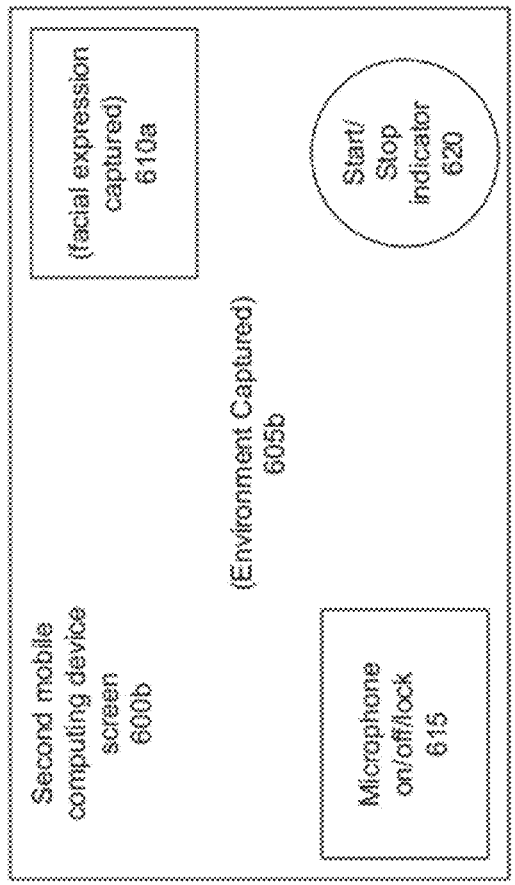
FIG. 6a
FIG. 6b

SERVER-ASSISTED VIDEO CONVERSATION

RELATED APPLICATION

This application claims the benefit of U.S. Provisional Application No. 61/351,711, filed on Jun. 4, 2010. The entire teachings of the above application are incorporated herein by reference.

TECHNICAL FIELD

The disclosure generally relates to the field of data transmission over a mobile computing device network, more specifically to the real time transmission of audio and video data over a mobile computing device network.

BACKGROUND

Mobile computing devices with the ability to record, transmit, and display audio and video data are well known. Such computing devices also include networking interfaces for communicating with the world via communications networks. Streaming audio and video from a mobile computing device is known, but difficult to achieve for a large scale service supporting heterogeneous devices over multiple networks. There are three problems associated with streaming video and audio from a mobile device. Network latency, device battery life, and device processing limitations all serve to decrease the quality and increase the delay of audio and video real time streams.

With regard to network latency, disparate mobile and web end-points result in mobile device networks with fluctuating bandwidth. This problem is expected to continue, both as the number of mobile and web device endpoints with video recording capabilities increases, and as wireless carrier networks expand into countries with limited network infrastructures. Furthermore, even within one wireless carrier network, the bandwidth available to each mobile computing device fluctuates as a function of time and the location of the mobile computing device. Thus, an inherent characteristic of wireless access is that it is inconsistent.

With regard to device processing and battery limitations, it is well known that mobile computing devices have limited battery life and limited processing ability. The recording and viewing of audio and video data on a mobile device is processor and battery intensive. Streaming that data over a network requires additional processing and battery power. Further, the more processing that is done by the mobile computing device to improve the quality of the transmission or to stabilize the transmission, the shorter the battery life and the higher the latency of the stream that is sent by the mobile computing device.

Current solutions are inadequate for achieving real time levels of latency in audio and video streaming in mobile computing devices.

SUMMARY

The present invention provides real time, two way streaming, of an audio-video conversation between mobile computing devices. In one aspect, the present invention optimizes streaming for real time "conversational" levels of latency when streaming between mobile computing devices. The present invention also provides ways to minimize the amount of processing and battery power required to provide the real time streaming "Conversational" or real time latency means an end-to-end video and audio latency of about 500 milliseconds or less with quality of video and audio sufficient for uninterrupted conversations such that both sides of a two way conversation can interact in real time.

Conversational latency is achieved, in part, by splitting the audio and video data streams from a given audio-video conversation, using two different transport protocols to send the separate streams over a network, and re-syncing them at the other end to provide a two way conversation experience. The protocols for the different streams are selected in view of the level of quality and continuity for each stream that is acceptable from a user experience point of view. The present invention makes use of a low-latency protocol such as "datagram" (e.g., no acknowledgement of transmission) transport protocol for audio transmission (referred below as "UDP" for brevity) and a "reliable" (or acknowledgement-based) transport protocol for video transmission to minimize the latency in the transmission of the stream (referred below as "TCP" for brevity). "Reliable protocol" can include TCP or any other means of error correction done using the nearest available server (e.g., server with lowest round trip time to the client).

In one embodiment, UDP is used for the audio stream, and TCP is used for the video stream. UDP is selected for audio stream to minimize latency in transmission; TCP is selected for the video stream to ensure that certain packets of video data are properly transmitted. Further, the transmission parameters for each stream are tuned based on feedback data to adjust the bit rate of the stream based on the available bandwidth of the network or other mobile computing device.

The present invention makes use of a centralized server system to offload processing requirements that would otherwise be handled by the mobile computing device. This in turn reduces mobile computing device battery consumption. Performing processing activities on a centralized server system with significantly more bandwidth and processing power as compared to a mobile computing device reduces the amount of latency in those tasks. This server-based solution would be particularly advantageous over any proposed peer-to-peer based video and audio chat solutions which have no server based processing source to leverage off of.

The present invention is able to implement real time two-way audio-video conversations between mobile computing devices over a disparate set of mobile computing device endpoints and web-based endpoints, and over different wireless carrier network infrastructures. Additionally, the invention allows for external observation of a two way conversation from web-based users. That is, any number of users of web end points can view the audio-video conversation between two remotely located mobile devices.

The invention has embodiments in various methods for the mobile device, and the centralized server system, as well as a mobile device apparatus, a centralized server system, and as computer program products.

According to an aspect of the invention there is provided a computer implemented method performed by a first mobile computing device for creating a two-way audio-video conversation between the first mobile computing device and a second mobile computing device, the method comprising: recording an audio data stream; encoding the audio data stream, the audio data stream comprising a stream of audio packets, each audio packet comprising an audio timestamp; receiving a video data stream; encoding the video data stream, the video data stream comprising a stream of video packets, each video packet comprising a video timestamp matching a corresponding audio timestamp and audio packet that was recorded concurrently with the video packet; transmitting the audio data stream over a first transport protocol to a centralized server; and transmitting the video data stream over a second transport protocol to the centralized server.

According to another aspect of the invention there is provided a computer implemented method performed by a centralized server for creating a two-way audio-video conversation between a first mobile computing device and a second mobile computing device, the method comprising: receiving an audio data stream over a first transport protocol from the first mobile computing device, the audio data stream encoded with a first audio codec; receiving a video data stream over a second transport protocol from the first mobile computing device, the video data stream encoded with a first video codec; receiving codec data from the second mobile computing device, the codec data comprising a list of codecs installed on the second mobile computing device, the list of codecs comprising a second audio codec and a second video codec; determining whether the list of codecs includes the first audio codec; responsive to determining that the list of codecs does not include the first audio codec, transcoding the audio stream using the second audio codec; determining whether the list of codecs includes the first video codec; responsive to determining that the list of codecs does not include the first video codec, transcoding the video stream using the second video codec; transmitting the audio data stream to the second mobile computing device over the first network protocol; and transmitting the video data stream to the second mobile computing device over the second network protocol.

According to another aspect of the invention there is provided a computer implemented method performed by a centralized server for creating a two-way audio-video conversation between a first mobile computing device and a second mobile computing device, the method comprising: receiving an audio data stream over a first transport protocol from the first mobile computing device, the audio data stream comprising a stream of packets and an audio bit rate; receiving a video data stream over a second transport protocol from the first mobile computing device, the video data stream comprising a stream of packets and a video bit rate; receiving feedback data from the second mobile computing device, the feedback data comprising a network bandwidth and a processing bandwidth; determining whether the sum of the audio bit rate and the video bit rate exceeds the either the network bandwidth or the processing bandwidth; responsive to determining that the sum of the audio bit rate and the video bit rate exceeds either the network bandwidth or the processing bandwidth, reducing the bit rate of video data stream below the network bandwidth and the processing bandwidth; transmitting the audio data stream to the second mobile computing device over the first network protocol; and transmitting the video data stream to the mobile computing device over the second network protocol.

According to another aspect of the invention there is provided a computer implemented method performed by a second mobile computing device for creating a two-way audio-video conversation between a first mobile computing device and the second mobile computing device, the method comprising: receiving an audio data stream over a first transport protocol, the audio data stream comprising a stream of audio packets, each packet comprising an audio timestamp; receiving a video data stream over a second transport protocol, the video data stream comprising a stream of video packets, each packet comprising a video timestamp; buffering the audio and video data streams in a buffer; synching the audio data stream with the video data stream, the synching comprising matching each audio timestamp and audio packet with a video timestamp and video packet, if a matching video timestamp is present in the buffer; outputting the synched audio data stream through an audio subsystem; and outputting the synched video data stream through a video subsystem concurrently with outputting the synched audio data stream.

According to another aspect of the invention there is provided an apparatus at a first mobile computing device for creating a two-way audio-video conversation between the first mobile computing device and a second mobile computing device, the apparatus comprising: an audio subsystem for recording an audio data stream and for encoding the audio data stream, the audio data stream comprising a stream of audio packets; a video subsystem for receiving a video data stream and for encoding the video data stream, the video data stream comprising a stream of video packets; a restore module for adding timestamps to the audio and video packets, each audio packet comprising an audio timestamp and each video packet comprising a video timestamp matching a corresponding audio timestamp and audio packet that was recorded concurrently with the video packet; an audio output for transmitting the audio data stream over a first transport protocol to a centralized server; and a video output for transmitting the video data stream over a second transport protocol to the centralized server.

According to another aspect of the invention there is provided an apparatus at a centralized server for creating a two-way audio-video conversation between a first mobile computing device and a second mobile computing device, the apparatus comprising: means for receiving an audio data stream over a first transport protocol from the first mobile computing device, the audio data stream encoded with a first audio codec; means for receiving a video data stream over a second transport protocol from the first mobile computing device, the video data stream encoded with a first video codec; means for receiving codec data from the second mobile computing device, the codec data comprising a list of codecs installed on the second mobile computing device, the list of codecs comprising a second audio codec and a second video codec; means for determining whether the list of codecs includes the first audio codec; means for transcoding the audio stream using the second audio codec, responsive to determining that the list of codecs does not include the first audio codec; means for determining whether the list of codecs includes the first video codec, responsive to determining that the list of codecs does not include the first video codec; means for transcoding the video stream using the second video codec; means for transmitting the audio data stream to the second mobile computing device over the first network protocol; and means for transmitting the video data stream to the second mobile computing device over the second network protocol.

According to another aspect of the invention there is provided an apparatus at a centralized server for creating a two-way audio-video conversation between a first mobile computing device and a second mobile computing device, the apparatus comprising: means for receiving an audio data stream over a first transport protocol from the first mobile computing device, the audio data stream comprising a stream of packets and an audio bit rate; means for receiving a video data stream over a second transport protocol from the first mobile computing device, the video data stream comprising a stream of packets and a video bit rate; means for receiving feedback data from the second mobile computing device, the feedback data comprising a network bandwidth and a processing bandwidth; means for determining whether the sum of the audio bit rate and the video bit rate exceeds the either the network bandwidth or the processing bandwidth; means for reducing the bit rate of video data stream below the network bandwidth and the processing bandwidth, responsive to determining that the sum of the audio bit rate and the video bit rate exceeds either the network bandwidth or the processing bandwidth; means for transmitting the audio data stream to the second mobile computing device over the first network protocol; and means for transmitting the video data stream to the mobile computing device over the second network protocol.

According to another aspect of the invention there is provided an apparatus at a second mobile computing device for creating a two-way audio-video conversation between a first mobile computing device and the second mobile computing device, the apparatus comprising: an audio input for receiving an audio data stream over a first transport protocol, the audio data stream comprising a stream of audio packets, each packet comprising an audio timestamp; a video input for receiving a video data stream over a second transport protocol, the video data stream comprising a stream of video packets, each packet comprising a video timestamp; a restore module for buffering the audio and video data streams in a buffer and synching the audio data stream with the video data stream, the synching comprising matching each audio timestamp and audio packet with a video timestamp and video packet, if a matching video timestamp is present in the buffer; an audio subsystem for outputting the synched audio data stream; and a video subsystem for outputting the synched video data stream concurrently with outputting the synched audio data stream.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF THE DRAWINGS

FIG. 4 illustrates one embodiment of a mobile computing device configured to support two way video conversations with respect to receiver functionality.

FIG. 5 illustrates one embodiment of a web device configured to interact with a two way conversation occurring between two mobile computing devices.

FIG. 6a illustrates one embodiment of an example two way conversation, including what is shown on the screen of a first mobile computing device.

FIG. 6b illustrates one embodiment of an example two way conversation, including what is shown on the screen of a second mobile computing device.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Level Overview

Figure 1:
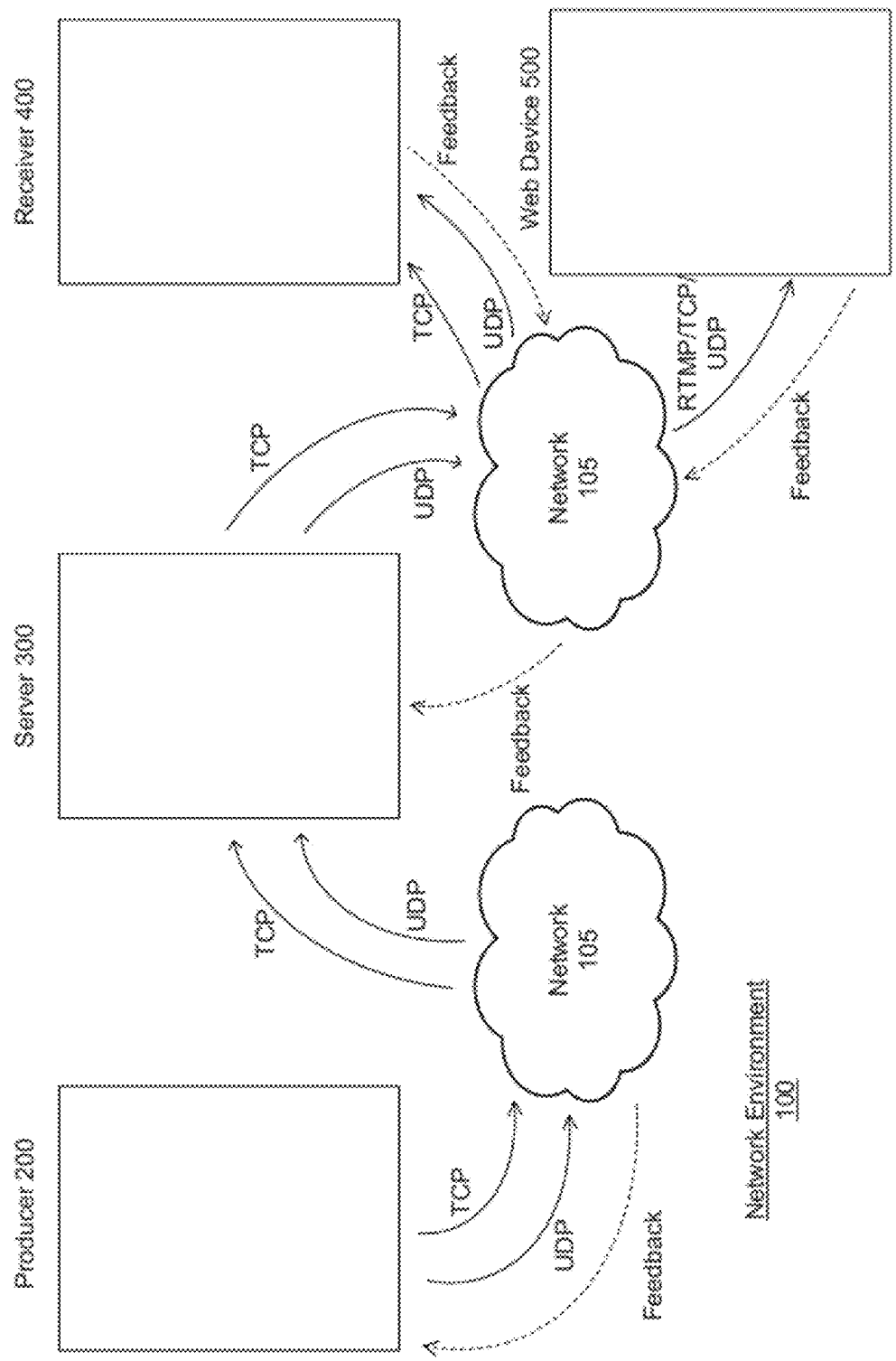
FIG. 1 illustrates one embodiment of a network environment and one side of a two way video conversations.

FIG. 1 illustrates one embodiment of a network environment 100 configured to support two way audio-video (or more simply, "video" for short) conversations. A two way video conversation comprises two mobile computing devices mutually sharing audio and video data from the two devices in real time. Thus, a first mobile computing device would be recording and transmitting audio and video data which would be transmitted to and received for viewing and listening on a second mobile computing device. Simultaneously, the second mobile computing device would also be recording and transmitting audio and video data which would be transmitted to and received for viewing and listening on the first mobile computing device. The two way conversation has a low enough latency between the round trip of the two sets of audio and video data such that a user of the first mobile computing device can experience the reaction of a friend at the second mobile computing device reacting to what the user is recording.

Thus, each mobile computing device in the network environment 100 acts simultaneously as both a producer 200 and receiver 400 of audio and video data. Each mobile computing device is said to be acting in full duplex. FIG. 1 illustrates one half of a two way video conversation. In FIG. 1, a first mobile computing device, acting in a producer 200 role, transmits audio and video data it has recorded to a second mobile computing device acting in a receiver 400 role. This, however, is only half the entire two way conversation, because simultaneously the second mobile computing device is also acting as a producer 200, and the first mobile computing device is acting as a receiver of data recorded at the second mobile computing device. Thus, a two way conversation the functionality is the same for both devices. FIG. 1 illustrates only one half of the two way conversation for clarity.

A producer 200 transmits data to a receiver 400 through a network 105. The producer 200 and receiver 400 communicate over multiple transport layer network protocols. The producer 200 and receiver 400 use the user datagram protocol (UDP) to exchange audio data, and the transmission control protocol (TCP) to exchange video data. The producer 200 is configured to transmit UDP and TCP data, and the receiver is configured to receive UDP and TCP data.

The network environment 100 also comprises a server system 300 in order to facilitate the transmission of audio and video data at the highest possible quality with the lowest latency, and minimize processor and battery strain on the remotely located mobile computing devices. The server system 300 is configured to send and receive UDP and TCP data to the receiver 400 and producer 200, respectively. That is, the server system 300 operates in the signal path between a given receiver 400 and producer 200 pair, receiving the two streams from each mobile device and relaying such streams to the other mobile device. The server system 300 is additionally configured to receive feedback data from the receiver 400, which is used to adjust the audio and video stream which is sent from the server system 300 to the receiver 400.

Optionally, the network environment 100 may additional comprise one or more web devices 500, where the users of such device can share in the experience of a two way conversation by monitoring or participating in a given video conversation between two mobile devices Alternatively, a mobile computing device may be set up to act solely as a producer 200 in order to serve as a one way broadcast directed web devices 500. In these cases, the server system 300 is additionally configured to send audio and video data to the web devices 500. The server system 300 can send the data to the web devices 500 in the form of UDP or TCP data as with the receiver device 400. Additionally, the server system 300 may send the audio and/or video data in the real time messaging protocol (RTMP) for consumption in a FLASH software type player within a browser of a web device 500.

Web devices 500 consuming a stream from a one way or two way conversation are additionally configured to participate in the experience by providing audio or text commentary video audio or text entry interfaces. This commentary can be shared with the participants of a two way conversation, the streamer of a one way broadcast, or with any other web devices 500 experiencing the conversation.

Producer

Figure 2:
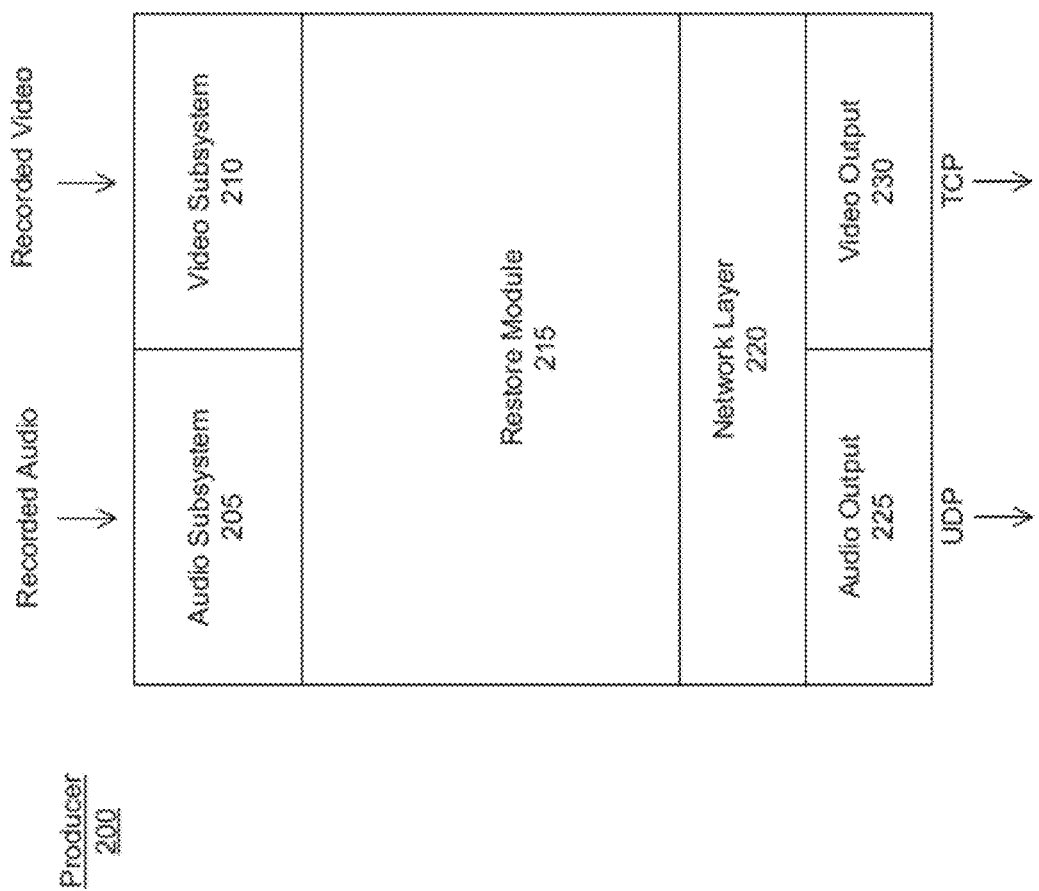
FIG. 2 illustrates one embodiment of a mobile computing device configured to support two way video conversations with respect to producer functionality.

FIG. 2 illustrates one embodiment of a mobile computing device acting as a producer 200 in a two way video conversation. The producer 200 is configured to record audio and video data using built in audio and video recording components, to perform a minimal amount of processing on the audio and video data to package the audio and video recording into a packet stream, and to transmit the audio and video data as packet data across a network 105 to a server system 300. The producer 200 system comprises an audio subsystem 205, a video subsystem 210, a restore module 215, a network layer module 220, an audio output 225, and an video output 230. The producer 200 records audio data at the audio subsystem 205. The producer 200 records video data at the video subsystem 210. The data is processed in the restore module 215. The data is then transmitted to the server system 300 through the audio 225 and video 230 outputs.

The audio subsystem 205 is configured to capture recorded audio as close to the hardware input interfaces and devices as possible. The audio subsystem 205 is configured to interact with several components native to the mobile computing device. When a conversation is initiated, the audio subsystem 205 interacts with the operating system of the mobile computing device to initiate the recording of audio. The operating system instructs the microphone device of the mobile computing device to record audio in the environment external to the mobile computing device. A digital signal processor converts the raw recorded audio signal from an analog format into a digital format. The operating system operates in conjunction with an audio codec to convert the digital audio signal into a coded bitstream that could be played on a computing device by an audio player with a complementary codec, such as WINDOWS MEDIA PLAYER.

Generally, the audio subsystem 205 receives the recorded audio signal immediately after the raw audio signal has been converted into a digital stream that conforms to a particular codec. By receiving the audio as early as possible, the audio subsystem 205 minimizes latency associated with unnecessary processing of the audio signal by processing software associated with the operating system of the mobile computing device. Further, eliminating unnecessary processing reduces the strain of the two way conversation on the processor of the mobile computing device, thereby also decreasing the battery requirements associated with maintaining the two way conversation stream.

The mechanism by which the audio subsystem 205 receives the recorded audio may differ depending upon the type of mobile computing device. For example, if the mobile computing device conforms to the audio recording architecture specified in devices from Apple, Inc. such as the iPHONE™, the audio subsystem receives the coded recorded audio from the Audio Queue Services interface, included accessible as part of the operating system of each Apple, Inc. device. The Audio Queue Services interfaces allows an application to directly access audio subsystem to receive the audio directly from the hardware itself, allowing the audio subsystem 205 to control how the audio is converted and encoded. Generally, an audio queue is a software object that the producer 400 uses for recording or playing audio. An audio queue does the work of connecting to audio hardware of the mobile device, managing memory of the device during recording, employing codecs, as needed, for compressed audio formats, and mediating recording or playback.

If the mobile computing device is a WINDOWS MOBILE™ computing device, the audio subsystem 205 captures the audio through the WAVEIO interface. If the device is a running the ANDROID™ platform, the audio interaction subsystem uses the AUDIORECORD native-code system or the ANDROID inter processor (IPC) communication system to obtain the audio.

The video subsystem is similarly configured to capture recorded video as close to the hardware input level as possible. The video subsystem is configured to interact with several components native to the mobile computing device. When a conversation is initiated, the video subsystem interacts with the operating system of the mobile computing device to initiate recording of the video. The operating system instructs the video camera device to record video in the environment external to the mobile computing device. The digital signal processor converts the raw recorded video signal from an analog format into a digital format. The operating system operates in conjunction with a video codec to convert the digital video signal into a coded bitstream that could be played on a computing device by a video player such as WINDOWS MEDIA PLAYER.

Generally, the video subsystem 210 receives the recorded video signal immediately after the raw video signal has been converted into a digital stream that conforms to a particular codec. By receiving the video as early as possible, the video subsystem 210 also removes latency associated with unnecessary processing of the video signal software associated with the operating system of the mobile computing device. Again, eliminating unnecessary processing reduces the strain of the two way conversation on the processor of the mobile computing device, thereby also decreasing the battery requirements associated with maintaining the two way conversation stream.

The restore module 215 receives both the encoded audio and video streams concurrently, and prepares them to be sent over the network 105 to the server system 300. When the restore module 215 receives the audio and video data streams from the audio 205 and video 210 subsystems, the streams are synchronized in time with each other, as a result of their concurrently recording. The audio and video streams are intentionally kept separate. At some points in this document, they may be referred to as a single stream for clarity, however the two streams are always maintained separately. This is contrary to those prior systems that transmit audio video streams together via a single transport protocol over a network.

The restore module 215 timestamps each frame (or packet) of the audio and video streams before they are sent out. The timestamps are assigned so that the audio and video data streams are synchronized in time. Corresponding audio and video packets have matching timestamps. Thus, when audio and video with matching timestamps is played back, the audio will be in sync with the video. The timestamps are assigned to every packet of audio and video data so that in the event any packets of data are dropped or otherwise not received by the receiver 400, the receiver will be able to re-sync the packets that are properly received.

Timestamps are also used in recovery of lost video data stream packets. Individual video frames are large, and as a result they are split into more than one packet (or packetized) by the restore module 210. One reason that TCP is used to send the video data is to request retransmission of video packets that are lost in transport between the producer 200, server 300, and receiver 400. TCP requests all lost data, as opposed to other transmission protocols, such as RTP, which do not request any lost data. Requests for lost data by the server 300 or receiver 400 can be made based on other received video data stream packets from the same frame. If a packet from a frame is lost, the timestamps from other packets that were properly received are used to request the missing packet. If the receiver 400 is requesting the data, the lost data is resent from server 300 if it has it, otherwise the server 300 re-requests the packet from the producer 200 to re-send. This increases the capability of the restore module 410 to restore missing video frames when the network bandwidth (or channel capacity) is small. In the case of audio, audio packets can be decoded even if the earlier ones are lost which is not the case with video frames as discussed above.

The restore module 215 is further configured to receive network bandwidth information from the network layer. The network bandwidth information includes information about the strength or quality of the network connection between the mobile computing device and the server system 300. In one embodiment, the network bandwidth information comprises a total bandwidth in kilobits per second (kbps) that the mobile computing device has available to send information over the network. The network bandwidth information may comprise an audio bandwidth portion, a video bandwidth portion, and a feedback bandwidth, representing how much bandwidth is available to send and receive audio data, video data, and feedback data respectively. Alternatively, the network bandwidth information may comprise a measure of how much bandwidth is available to send data to a server system 300, and how much bandwidth is available to receive data from the server system 300. In a two way conversation, some of the bandwidth available to the mobile computing device is allocated to receive data from another mobile computing device, in addition to merely sending data. This is a result of the fact that in a two way conversation, a mobile computing device acts as both a producer and receiver.

The restore module 215 uses the network bandwidth information to determine the bit rate for sending the audio and video data to the server system 300. In one embodiment, the restore module communicates with the audio subsystem 205 and the video subsystem 210 to configure the bit rates at which these will record and encode audio and video. In another embodiment, the audio 205 and video 210 subsystems record audio and video at fixed bit rates based on the capabilities of the mobile computing device. In this case, the restore module 215 converts the bit rate of the audio and video stream dynamically based on the available bandwidth. As this embodiment requires additional processing to be performed by the producer 200, it is preferably used with mobile devices with faster processors and/or extended battery life.

The audio output module 225 receives the recorded and encoded audio data stream from either the audio subsystem 205 directly or from the restore module 215. The audio output module 225 transmits the audio stream over the network 105 to the server system 300. The audio output module 225 transmits the data by making use of the network layer 220.

As described above, the audio output module 225 transmits the audio stream using UDP. UDP is used for several reasons. UDP has extremely low latency for data transmission. This makes it ideal for transmitting audio streams where a very low latency is important. UDP partially achieves its low latency by not requiring an acknowledgement (ACK) from the target device that is receiving the UDP transmission (in this case, it is the server system 300). UDP is one of a class of transport protocols that do not require acknowledgement of receipt of transmitted packets, commonly known as "datagram" protocols. The consequence of not having an ACK, however, is that some packets will be lost in the transmission. Under UDP, these packets art are never re-transmitted. This loss of audio data is deemed acceptable in exchange for the better latency provided by UDP. In one embodiment, losing up to 20 milliseconds of audio data is deemed acceptable as not significantly interfering with the user's experience of a conversation, since users are to still understand voice transmissions even if some of the audio data is missing.

The video output module 230 receives the recorded and encoded video data stream from either the video subsystem 210 directly or from the restore module 215. The video output module transmits the video stream over the network 105 to the server system 300. The video output module transmits the data by making use of the network layer 220.

As described above, the video output module 230 transmits the video stream using TCP. TCP is used, as opposed to UDP, because it makes use of ACK signals to ensure each frame of TCP data is received by the recipient on the other side of a network. TCP is one of a class of transport protocols that require acknowledgement of receipt of a transmitted packet, commonly known as "reliable" protocols. Acknowledgement that each frame has reached the recipient is desired because many video encoding mechanisms differentiate between types of frames of video data that are sent to a recipient. These encoding technologies refer to video data as being differentially encoded using both intra-coded frames (typically called "I-frames"), which are coded without reference to any other frame, and predicted frames which are predictively coded from one or more I-frames and optionally other predicted frames. (Predicted frames are typically called "P-frames". For purposes of simplicity, "P-frames" will be used to refer to any type of predicted frame, including forward predicted as well as bi-directionally predicted frames.) I-frames require more data as they contain all of the data of a single frame of video and are sent relatively infrequently. The P-frames are then coded based differences from the I-frame, and neighboring P-frames. This allows the P-frames to be coded with much less data than the I-frames.

As a result, if one more packets of an I-frame are lost during transmission, all the subsequent P-frames until the next I-frame may not decodable by the mobile device, leading to dropped frames in the video player, and a visible degradation of playback quality, such as significant lags or breaks in the play back. In contrast, if packets for a P-frame are lost, the degradation is likely to not be as visually significant. Thus, TCP is used by the video output module to ensure coherence of the video data stream such that all frames are received by the server system 300.

Server

Figure 3:
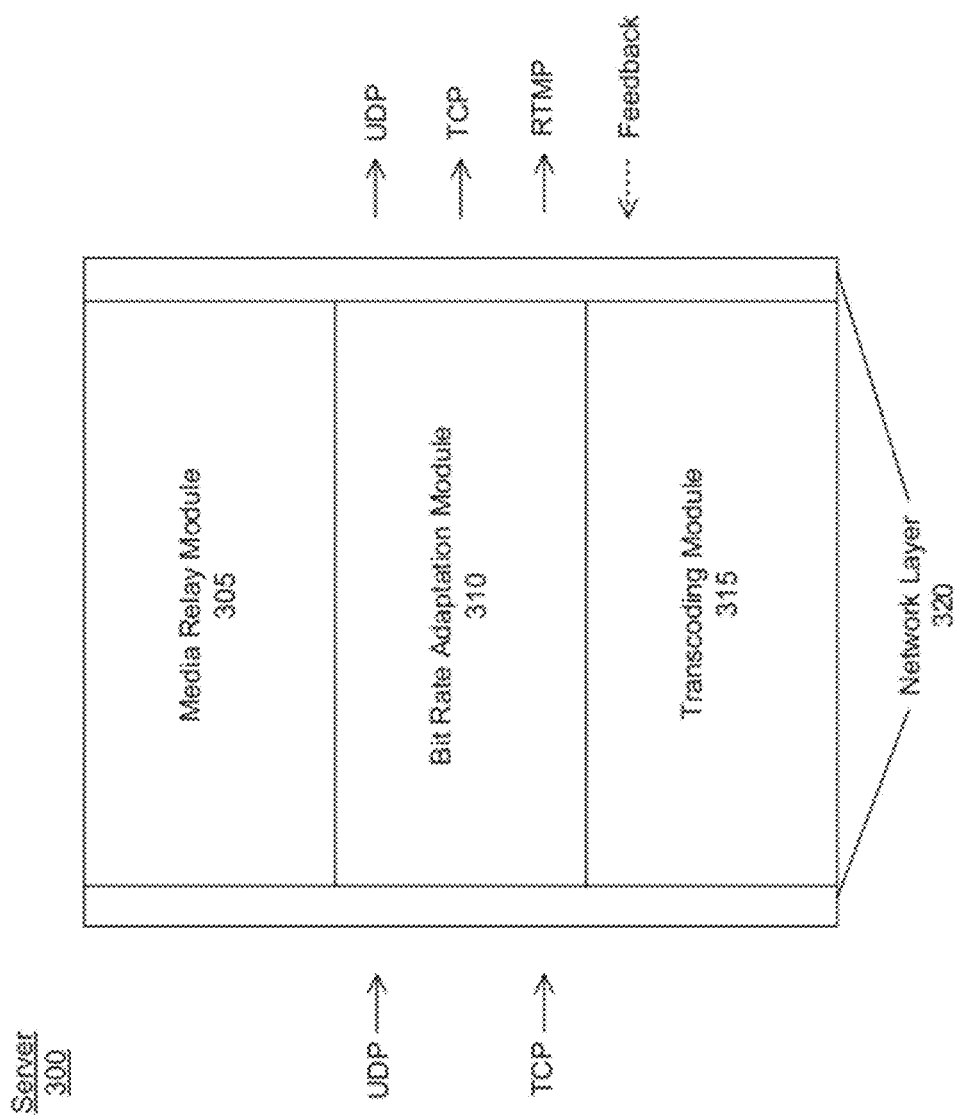
FIG. 3 illustrates one embodiment of a server device configured to modify and relay a two way video conversation between a producer and a receiver.
Figure 7:
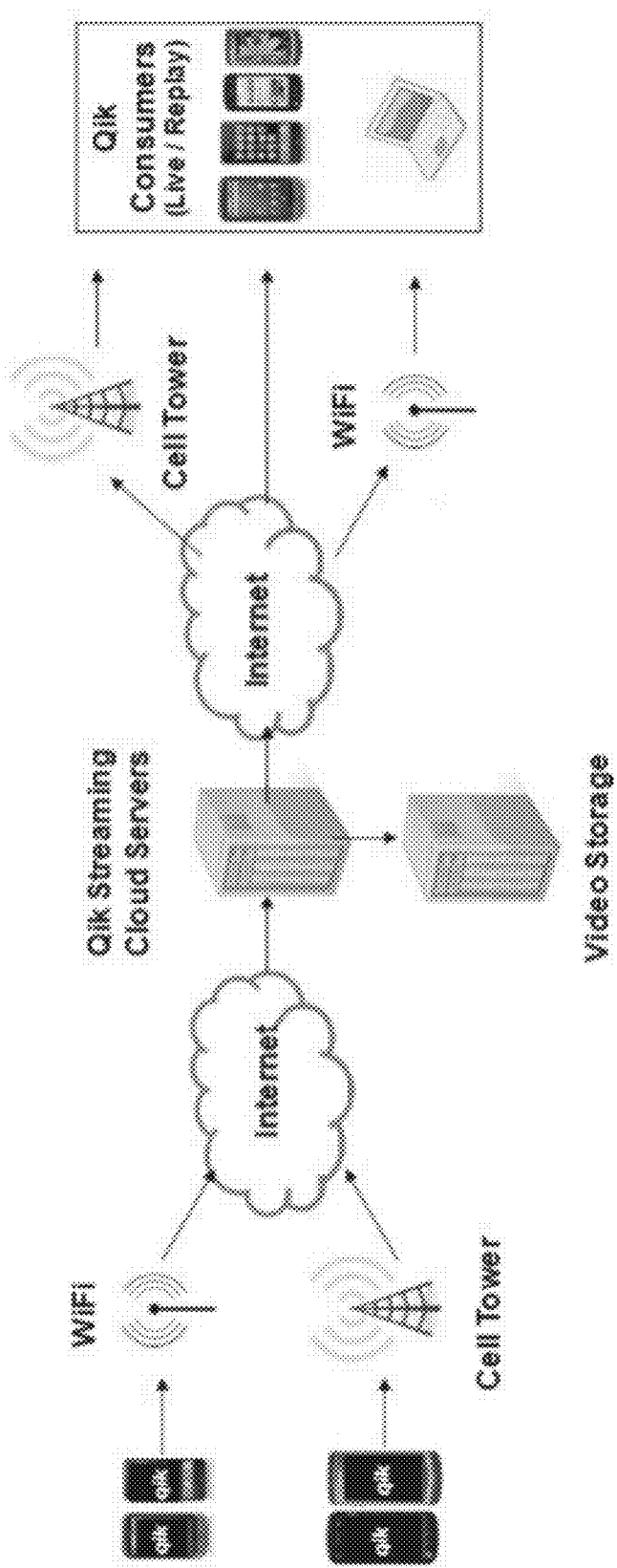
FIG. 7 illustrates one embodiment of a hardware infrastructure for devices configured to support a two way video conversation.
Figure 8:
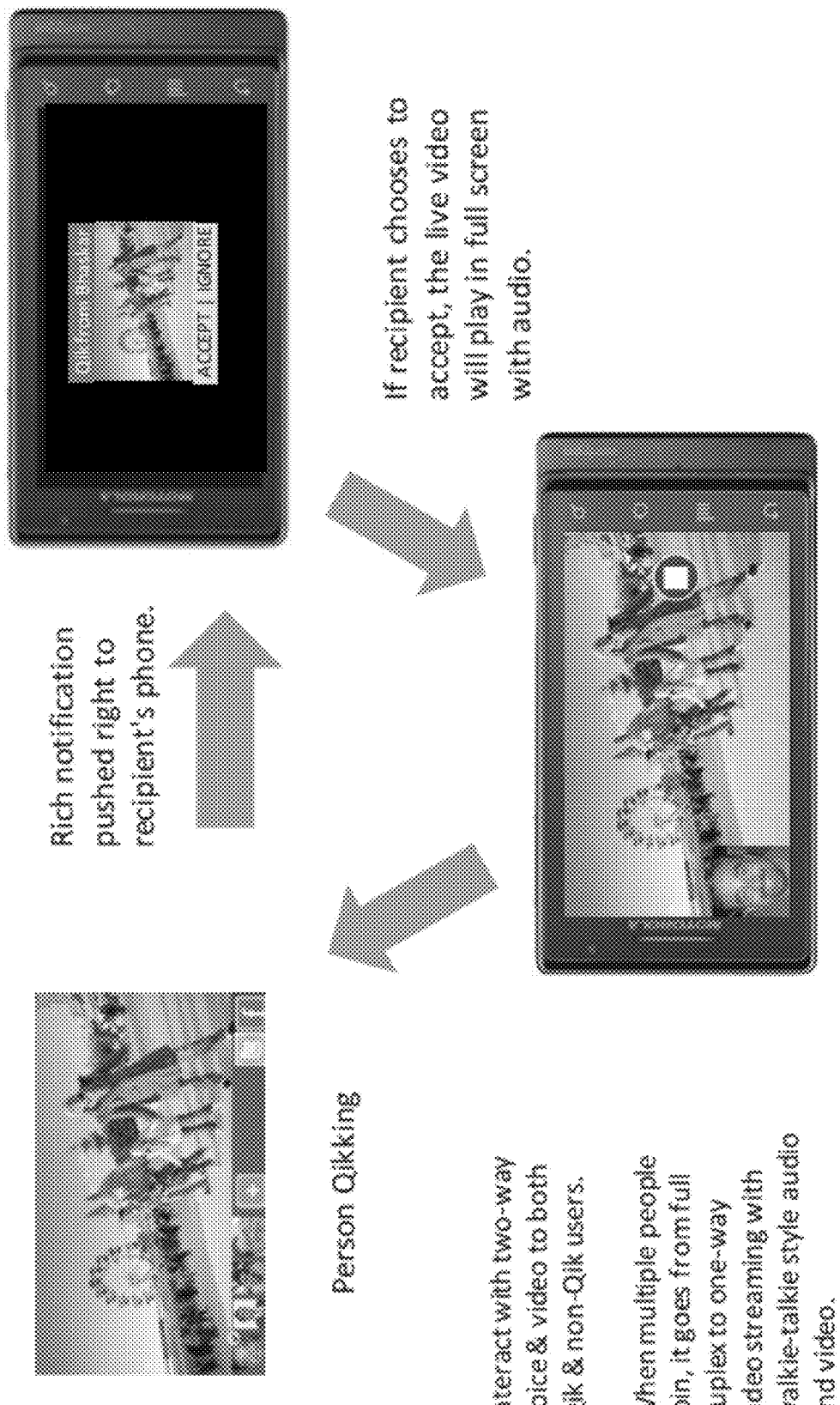
FIG. 8 illustrates one embodiment of a process for initiating a two way video conversation.
Figure 9:
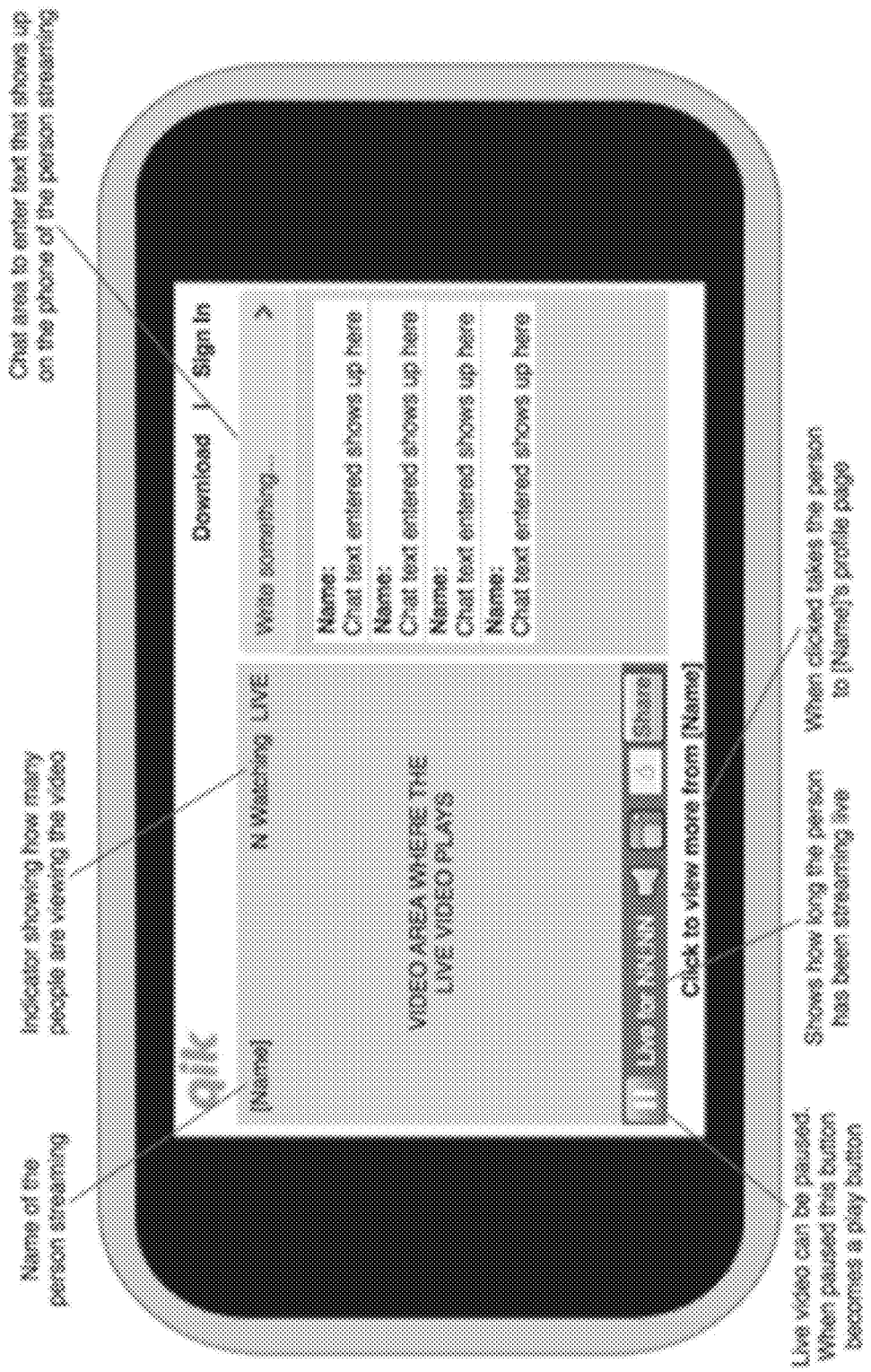
FIG. 9 illustrates one embodiment of a web device for observing a two way video conversation with text-based participation functionality.

FIG. 3 illustrates one embodiment of a server-class computer apparatus acting as a server system 300 (or portion thereof) facilitating a two way conversation. The server system 300 is configured to receive audio and video data streams from the producer 200, perform various manipulations to the data streams, and to transmit the data streams to a receiver 400 and/or one more web devices 500. The server system 300 comprises a network layer 320 for the input and output of the data stream, a bit rate adaptation module 310, a media relay module 305, and a transcoding module 315. The server system 320 includes other components such as processors, memory, storage devices (e.g., hard disk), networking and security mechanisms (e.g., routers, firewalls, caches, etc.), which are not shown for clarity. While only a single server computer is shown for clarity, in practice the server system 300 would comprise multiple server computers coupled together in a network. The bit rate adaptation module 310 is configured to receive the audio and video data streams from the network layer 320 as they arrive from the producer 200. The bit rate adaptation module also receives information about the receiver 400 in the form of feedback data from the network layer 320. The bit rate adaptation module 310 uses all of this data to determine how the audio and video data streams should be forwarded to the receiver 400. The function of the bit rate adaptation module 310 is to relay the audio and video data streams to the receiver 400 in a format and bit rate the receiver understands, with the minimal amount of processing and latency necessary.

Towards this end, the bit rate adaptation module 310 is configured to manipulate the audio and video data streams as they pass through the server system 300 in order to provide the receiver 400 with the best possible version of the audio and video that the receiver can handle, based on the capability of the mobile computing device at the receiver 400, and the network bandwidth in between the server system 300 and the receiver 400.

The bit rate adaptation module 310 is further configured to make an archive copy of the audio and video data streams for storage on the server system 300 as they are received from the producer 200. The bit rate adaptation module 310 may delegate this task to either the media relay module 305 or transcoding module 315 as necessary to ensure that the archiving of the stream does not impact the latency of the streams any more than is necessary.

If the sufficient network bandwidth is available to the receiver 400 to receive a full bandwidth transmission of the two stream, and the mobile computing device has a processing power sufficient to handle the unmodified audio and video data streams as they were received by the server system 300, then the bit rate adaptation module 310 routes the audio and video data streams through the media relay module 305. In one embodiment, the network bandwidth may be determined by receiving feedback data from the receiver 400. Alternatively or in combination with the above embodiment, the bit rate adaptation module 310 or the media relay module 305 can begin sending the data streams to the receiver, 400, and measure the rate at which the data streams are received to calculate the network bandwidth available to the receiver.

The media relay module 305 is configured serve as a pass-through to transmit the audio and video data streams as fast as possible in order to reduce the overall latency of the two way conversation. The media relay module 305 additionally makes an archive copy of the audio and video data streams for storage on the server system 300.

The bit rate adaptation module 310 is further configured to modify the audio and video data streams before passing them to the receiver 400 over the network 105. This occurs when the network bandwidth available to the receiver 400 and/or the processing power (or bandwidth) of the mobile computing device at the receiver 400 are insufficient to handle bit rate of the data streams received at the server from the producer 200.

In one embodiment, the bit rate adaptation module 310 determines that insufficient bandwidth is available by comparing the sum of the audio data stream bit rate and the video data stream bit rate against both the network bandwidth and the processing bandwidth. If the summed bit rate exceeds either of these bandwidths, the bit rate adaptation module 310 reduces the bit rate of either or both of the data streams to meet the bandwidth limitations.

In one embodiment, the bit rate adaptation module 310 is configured to drop frames from the video data stream in order to meet the bit rate limitations of the network 105 or receiver 400 mobile computing device. In another embodiment, the bit rate adaptation module 310 is configured to down-covert the video data stream to a lower screen resolution and/or video quality in order to meet the above limitations. In other embodiments, the bit rate adaptation module 310 is configured to down sample or reduce in bit rate the audio data stream in order to meet the above limitations. The bit rate adaptation module 310 can use any combination of these adaptations as well.

In the event the video frame rate of the video stream drops in response to a limited receiver 400 bandwidth, the experience of the user will be affected. It is expected that observers of a stream will expect the video quality to be poor if the network or mobile device capability is poor. However, in order to ensure the video stream does not lose significant coherence, only certain frames of the video sent over TCP can be dropped. If an I-frame or portion thereof is dropped, the quality of the video is substantially reduced (including potentially some delay in decoding and the loss of one or more frames in the playback) until the next I-frame is received. When deciding which frames to drop, the bit rate adaptation module 310 will only drop P-frames. The ability of the bit rate adaptation module 310 to decide which frames to drop is another reason TCP is used to transmit the video data stream instead of another transport protocol.

The embodiment where the bit rate adaptation module 310 drops frames of the video stream data has advantages over the other methods of adjusting the audio and video streams for consumption at the receiver. Dropping frames requires very little processing by the server system 300 compared to adjusting the bit rate of either the audio or video stream by converting them to a lower quality format. Dropping frames can be performed on the fly, and can more rapidly adjust to changing throughput conditions that re-processing at a lower resolution. Additionally, dropping the frames on the server system 300 rather than upon receipt by the receiver 400 lowers the processing requirements on the mobile computing device, which is beneficial in the case of a low end mobile computing device. Further, reducing the processing performed by the mobile computing device in turn lowers the battery requirement for decoding, and thus improves overall performance of the mobile computing device.

In one embodiment, if the time-averaged bit rate that the receiver 400 can accept is less than the video data stream bit rate received from the producer 200, then the server system 300 decreases the video bit rate sent to the receiver 400 only. In another embodiment, if the time-averaged bit rate that the receiver 400 can accept is less than the than video data stream bit rate received from the producer 200, then the server system 300 decreases the video bit rate sent to the receiver 400 and also sends the feedback data (as described above) to the producer 200. In this embodiment, the feedback data is used to lower the bit rate of the video data stream sent from the producer 200 to the server 300. In either of these embodiments, the feedback data is sent at regular intervals based on the consumption pattern of the receiver 400 measured by the server system 300.

Normally the audio data stream bit rate is low enough that no audio data needs to be dropped, especially considering that some audio may be lost because UDP is used as the transfer protocol. In one embodiment, however, the bit rate adaptation module 310 is additionally configured to drop packets of audio data received from the producer 200 in order to lower the audio bit rate sent to the receiver 400. However, audio data will only be dropped after the audio data stream has been initially received/initialized at the receiver 400.

Depending upon the hardware and/or software configuration of the recipient of the data streams, in some cases it is beneficial to translate the audio and video data streams into a format that can be read by the recipient. For example, the codec used to encode the video at the producer 200 may not be a codec that is installed on the mobile computing device of the receiver 400. In another example, a web device 500 may be configured to receive a ADOBE FLASH type video data stream, whereas the producer 200 originally encoded the video in H.264 or H.263 format.

In the event the bit rate adaptation module 310 determines that either of the data streams need to be re-encoded, the bit rate adaptation module 310 will pass off the data streams to the transcoding module 315. The transcoding module 315 is configured to re-encode either the audio or the video data streams on the fly and to transmit the re-encoded streams through the network layer 310 to the receiver 400 or any web devices 500. The transcoding function is designed to minimize latency and maintain quality of the audio and video streams. The transcoding module 315 may additionally be tasked with archiving a copy of the audio or video streams in the new or old format.

Transcoding is additional processing that will typically add latency to the stream of audio and video data. This added latency can be offset by reducing the bit rate of data that is sent to the server 300 from the producer 200. The restore module 215 of the producer 200, the restore module 415 of the receiver 400, and the bit rate adaptation module 310 of the server are all configured to compute the bit rate for every incoming channel of each stream of audio and video data. These bit rate statistics are sent along with the packets of audio and video data between the producer 200, server 300, and receiver 400. When the bit rate statistics are fed back to the producer 200 as feedback data along with information indicating that transcoding is being performed, this gives producer 200 information about the network bandwidth (or channel capacity) between the producer and the server, and between the server and the receiver. The producer 200 may then adapt the bit rate for the audio and video streams to avoid extra transcoding in the server 300 that would otherwise introduce delay in the two way video conversation.

Receiver

FIG. 4 illustrates one embodiment of a mobile computing device acting as a receiver 400. The receiver 400 is configured to receive the separated audio and video data streams from the server system 300, sync them together, and play them back for the user of the mobile computing device. The receiver 400 system comprises an audio subsystem 405, a video subsystem 410, a restore module 415, a network layer module 420, an audio output 425, and a video input 430.

A receiver 400 generally operates in the reverse of the producer 200. The audio input 425 is configured to receive a UDP audio data stream from the server system 300 over the network 105. Similarly, the video input 430 is configured to receive a TCP video data stream from the server system 300 over the network 105. The audio and video data streams are passed to the restore module 415. The audio input 425 will generally receive the first packets of audio data prior to when the video input 430 receives the first packets of video data. This is a consequence (but not a requirement) of using UDP to transfer the audio versus the TCP used for video.

The restore module 415 is configured to sync the audio and video data streams received by the receiver 400. The audio and video data streams were initially synched when they were recorded at the producer 200. However, the two streams will likely arrive at different times at the receiver 400. This may be due to the fact that the streams are sent separately via different transport protocols, because network bandwidth issues may have arisen, or because of transcoding or bit rate adaptation. More specifically, if video frames have been dropped, the audio and video will immediately be out of sync. The restore module 415 uses the audio data stream as a starting point to sync the audio and video data streams. The restore module 415 uses the timestamp information included in the audio data stream to sync audio data with video data.

The restore module 415 is additionally configured to maintain an adaptive jitter buffer to help ensure synchronous audio and video playback. The jitter buffer maintains a playback buffer of at least 250 ms for both the audio and video data streams. This helps ensure that the playback of the audio and video data streams is not interrupted by momentary drops in the incoming audio and video data streams due to bandwidth or mobile device processing limitations. In one embodiment the restore module 415 looks at the video packets and drops them if they are out of sync. In another embodiment, the module 415 additionally comprises error correction algorithms for correcting the audio and video streams to improve playback quality.

The audio subsystem 405 and video subsystem 410 are configured by the restore module 415 to output the re-synched audio and video data streams for the user of the mobile computing device. The audio and video subsystems make use of the underlying hardware and software native to the mobile computing device, as described above for their equivalents in the producer 200. Thus, the audio and video systems make use of the operating system, digital signal processor, video display and speaker components of the mobile computing device to play back the audio and video data streams in real time for the user of the mobile computing device.

The audio subsystem 405 is configured to decode the audio data stream based on an installed audio codec and output it to a speaker. The audio subsystem uses the digital signal processor of the mobile computing device to convert the decoded audio data into an analog, time-varying voltage signal, which is fed to the speaker of the mobile computing device. The video subsystem 410 uses an installed video codec and the operating system of the mobile computing device to decode the video stream data. The decoded video data is fed to the video display screen of the mobile computing device.

Depending upon the bit rate of the audio and video data streams received by the receiver 400 and the capability of the receiver 400 mobile computing device to process the incoming data, the buffer of the restore module 415 may fill with data waiting to be played out to the user. The restore module 415 is configured to send feedback data through the network layer 420 over the network 105 to the server system 300 to provide the server with data about the receiver's 400 ability process the incoming data streams. The feedback data includes latency data about the connection between the receiver 400 and the server system 300, which may be in the form of time stamp data. The feedback data additionally comprises a processing bandwidth indicating the amount of data the mobile computing device at the receiver 400 can process. In one embodiment, the feedback data is in the form of the amount of bandwidth available to the receiver, in the form of a number of kilobits per second the receiver 400 can handle, both based on latency and processing ability. The feedback data may additionally comprise codec data including information about the audio and video codecs installed on the receiver 400, which informs the server system 300 if transcoding is necessary.

Web Device

FIG. 5 illustrates one embodiment of a web device 500 configured to act as a third party observer to a two way conversation between two mobile computing devices, or as a third party to a one way conversation being broadcast for consumption by third parties. The web device 500 is meant to be run on top of any type of hardware platform that has internet connectivity with a software platform on top that runs a traditional web browser. The web device 500 comprises an audio video module 520, a text module 530, a restore module 515, a flash module 510, and a browser 505.

Generally, the web device 500 functions in the same manner as a receiver 400. All aspects of the receiver are also performed by a web device 500. For example, restore module 515 is configured to buffer, sync, and provide feedback data on the audio and video streams received from the server system 300 in the same manner as the restore module 415 of the receiver 400. In other embodiments, the web device may be configured to perform the functions of a producer 200.

The web device 500 differs in a few aspects. Although the web device 500 may be configured to receive a TCP video data stream as with the receiver 400, the web device 500 may also be configured to receive a real time messaging protocol (RTMP), video data stream as well. The web device 500 is also configured to receive streams via real time streaming protocol (RTSP), Apple's proprietary HTTP live streaming, and extensible messaging and presence protocol (XMPP) for Google GTALK users.

The web device 500 is also configured to play back the synched audio and video data streams through the browser 505 installed on the operating system of the mobile computing device. The restore module 515 is additionally configured to communicate with an ADOBE FLASH 510 installation on the web device 500 to facilitate playback of the audio and video streams through the browser 505 [0071] The web device 500 is not configured to serve as one endpoint for a two way conversation. Thus the underlying hardware of the web device 500 does not also function as a producer 200, unlike a mobile computing device that functions as both a producer 200 and a receiver 400 in a two way conversation.

The web device 500 comprises a text module 530 allowing an observer using the web device 500 to interact with the parties of the two way or one way conversation, or with other web devices 500 through the exchange of text messages. The text messages are input by a user of the web device 500 through the browser 505, specifically through the flash player 510. The audio video module 520 additionally allows the web device 500 to output an audio data stream, so that an observer using a web device 500 can provide audio feedback on a one or two way conversation.

Network Layer Optimizations and Battery Optimization

In order to help achieve conversational latency, a data stream manipulation technique is used. This technique involves the management of the network traffic that is sent out from the network layers 220 and 330 of the producer 200 and server system 300. The present invention is designed to work on all different types of mobile computing devices. An additional layer of complexity is that there are approximately 380 different wireless network carriers that service the multitude of different mobile computing devices that are currently sold. Examples of wireless network carriers include AT&T, SPRINT, VERIZON, and NTT. Different wireless carriers have different network infrastructures for send and receiving data to and from their supported mobile computing devices.

Specifically, different carriers have different maximum transfer units (MTUs) based on their capabilities of their network infrastructure. The maximum transfer unit represents the largest packet size the carrier can transfer at a time. If the mobile computing device attempts to send a packet that is larger than the MTU, then the carrier breaks up the packet before transmitting it over the network. This occurs at the expense of some processing and latency time to perform the conversion. While it is possible to implement the producer and server system 320 without consideration of the MTU of the carrier on which the mobile computing device is operating, conversational latency is more easily achieved when doing so.

In one embodiment, the network layers 220 and 300 of the producer 200 and server system 300 are configured to detect the MTU of the network 105 in between the source and destination of the data. For example, the MTU between a producer 200 and server system 300 might be 1024 bytes, whereas the MTU between the server and a receiver might be 512 bytes. By packaging the bytes to be sent in the network layers 220, 320 before transmitting them over the network 105, the adjustment of the MTU reduces the latency associated with converting the data to meet the MTU requirement of the wireless carrier. As a result, the present invention is better able to achieve conversational latency in a one way or two way conversation.

Operating the one or two way conversation on a mobile computing device makes use of the touch screen, network device, camera, software audio-video encoders (coprocessors), and CPU of the mobile computing device, all of which all take up battery power. In most mobile computing device operating systems, a "standby mode" saves battery by making extensive use of a notification service on the device. The producer 200 and receiver 400 use standby mode to minimize battery usage. Specifically, the producer 200 and receiver 400 receiver "keep alive" packets from the server 300 to periodically wake up. The server 300 works with the mobile computing devices by randomizing the transmission times of the keep alive packets to reduce battery consumption. Another option is to use timers, however because timers take up processing time on the CPU of the mobile computing device, they are better used only in mobile computing devices with high end processors and battery life.

Use Case Scenarios

The process for a two way conversation varies somewhat depending upon a few factors. These factors include the processing ability of the mobile computing devices involved in the two way conversation, the bandwidth of the network between them, and whether or not transcoding needs to be performer for either mobile computing device or for any web devices observing the conversation. Depending upon these factors, several use cases can arise.

The first case is where both mobile computing devices have high end hardware, such that the mobile computing devices can handle the processing required for inputting, streaming, and outputting audio and video. Here, the producer 200 produces the audio and video and streams it over the network 105 to the server system 300. The server begins an initialization (or "handshake") procedure with the receiver 400 mobile computing device. The server system 300 receives feedback data from the receiver 400 regarding the codecs for audio and video decoding that are installed on the receiver, as well as information about the processing ability of the receiver and network bandwidth information.

In this first case, the receiver's 400 feedback data indicates that the receiver is capable of handling all of the video and audio stream data that the producer 200 has sent. Further, in this case assume that no transcoding is necessary, so that the receiver can accept the stream as is. The server system 300 passes the control of the stream from the bit rate adaptation module 310 to the media relay module 305. The media relay module 305 passes the stream along to the receiver 400 with minimal possible delay. Once the receiver receives the stream, no further feedback is necessary unless the network bandwidth drops. If the network bandwidth drops, and the buffer in the restore module 415 on the receiver 400 fills up, then feedback data is sent to the server system 300 indicating that the bit rate adaptation module 310 should take over from the media relay module 405 to lower the bit rate of the stream sent to the receiver.

The second case is where the mobile computing device acting as a producer 200 has high end hardware and the mobile computing device acting as a receiver 400 has low end hardware. In this case, the initialization process feedback data from the receiver 400 to the server system 300 will indicate that the receiver 400 cannot handle the full stream of data that was sent from the producer 200. The bit rate adaptation module 310 will handle the stream, and will drop the bit rate of the video stream in order to meet the processing limitation of the receiver 400. For example, if the bit rate of the video in the stream from the producer 200 is 120 kbps, and the receiver's feedback data indicates that the receiver 400 can only handle 80 kbps, then the bit rate adaptation module 310 will drop frames of video until the requisite bit rate of 80 kpbs is met.

The third case is where the mobile computing device acting as a receiver 400 has a different audio or video codec installed than the mobile computing device acting as a producer 200. In this case, the initialization process feedback data from the receiver 400 to the server system 300 will indicate what audio and video codecs are installed on the receiver 400. The bit rate adaptation module 310 will pass the audio or video stream (or both) needing transcoding to the transcoding module 315. The transcoding module 315 will transcode as needed before passing the streams along to the receiver 400.

Since transcoding involves extra processing, there is some added latency to passing the stream to the transcoding module 315. As necessary, the transcoding module 310 may pass the audio or video stream back to the bit rate adaptation module 315 to lower the bit rate of the outgoing stream in order to make up for this additional latency.

Two Way Conversation Example

FIGS. 6a and 6b illustrate one embodiment of a sample two way conversation between two mobile computing devices. In both FIG. 6a and FIG. 6b, the microphone on/off/lock 615 indicates whether the microphone of the mobile computing device is currently recording audio. Also in FIGS. 6a and 6b, the start/stop indicator 620 indicates whether the mobile computing device is actively capturing video and audio. The two indicators are separate so that video can be captured without audio if desired.

FIG. 6a illustrates a first mobile computing device acting as both a producer and a receiver in a two way conversation with the second mobile computing device depicted in FIG. 6b. The mobile computing device in FIG. 6a is using a camera on the opposite side of the display screen to capture an external environment in front of the user of the mobile computing device. The environment captured by the camera is displayed on the screen 600a of the first mobile computing device in a small portion of the screen 605a. This camera feeds the video stream directly into the small corner of the screen 605a so that the user knows what is being captured and sent to the second mobile computing device 600b. Acting as a producer, the first mobile computing device sends the audio and video stream to the server, which is then transmitted in real time to the second mobile computing device.

Acting as a receiver, the second mobile computing device receives the audio and video streams from the server. The screen 600b of the second mobile computing displays the received video 605b. In one embodiment, the received stream fills up the majority of the screen to give the user a good picture what is being recorded by the first mobile computing device. A front facing camera on the second mobile computing device records the image of the user of the second mobile computing device in real time in response to viewing the stream from the first mobile computing device. The recorded image is displayed in a small corner of the screen 610a, and is a direct feed from the front facing camera. Thus in both mobile computing devices, a small corner of the screen is reserved to give the user a preview of what is being recorded, so that the user may adjust the mobile computing device to capture the correct content to send it to the other mobile computing device.

Acting simultaneously as a producer, the second mobile computing device sends the stream of the second user's reaction to the first user's content to the server and from there to the first mobile computing device. The first mobile computing device, also acting simultaneously as a receiver, displays the stream of the reaction of the other user in the center of the screen 610b of the mobile computing device.

Additional Considerations

In this description, the term "module" refers to computational logic for providing the specified functionality A module can be implemented in hardware, firmware, and/or software. Where the modules described herein are implemented as software, the module can be implemented as a standalone program, but can also be implemented through other means, for example as part of a larger program, as a plurality of separate programs, or as one or more statically or dynamically linked libraries. It will be understood that the named modules described herein represent one embodiment of the present invention, and other embodiments may include other modules. In addition, other embodiments may lack modules described herein and/or distribute the described functionality among the modules in a different manner Additionally, the functionalities attributed to more than one module can be incorporated into a single module. In an embodiment where the modules as implemented by software, the modules are persistently (i.e., non-transitorily) stored on the computer-readable storage devices of the mobile device or server system, loaded into memory, and executed by the one or more processors.

Mobile computing devices, server devices, and web devices include hardware elements necessary for the operations described here, including one or more processors, high speed memory, hard disk storage and backup, network interfaces and protocols, input devices for data entry, and output devices for display, printing, or other presentations of data. The mobile computing devices and web devices additionally comprise audio and video inputs for audio and video capture, streaming, and recording. The mobile computing devices also comprise digital signal processors for converting recorded audio and video back and forth from analog to digital signals. The mobile computing devices additionally comprise microphones for recording audio, speakers for playing recorded audio, and cameras, front facing or rear facing, for recording video.

The mobile computing device additionally comprises an operating system. The operating system comprises audio and video codecs for converting raw audio and video input to and from a computer readable format. Example audio codecs include G711, AAC, Vorbis. Example video codecs include QUICKTIME, MPEG H.264, H.263, and VP8. The present invention can work other codecs as well.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs executed by a processor, equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof. If implemented in software, the software may be written in any language that can support the embodiments disclosed herein. The software may be stored on any form of non-transitory computer readable medium, such as random access memory (RAM), read only memory (ROM), compact disk read only memory (CD-ROM), flash memory, hard drive, and so forth.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for server assisted two way video conversations through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer implemented method performed by a first mobile computing device for creating a two-way audio-video conversation between the first mobile computing device and a second mobile computing device, the method comprising:
    recording an audio data stream;
    encoding the audio data stream, the audio data stream comprising a stream of audio packets, each audio packet comprising an audio timestamp;
    receiving a video data stream;
    encoding the video data stream, the video data stream comprising a stream of video packets, each video packet comprising a video timestamp matching a corresponding audio timestamp and audio packet that was recorded concurrently with the video packet;
    offloading to a centralized server processing of the audio data stream and video data stream for the two-way audio-video conversation between the first mobile computing device and the second mobile computing device by:
    splitting the audio data stream and video data streams into separate data streams for communication to the centralized server;
    transmitting the audio data stream over a first transport protocol to the centralized server; and
    transmitting the video data stream separately from the audio data stream over a second transport protocol to the centralized server, the centralized server configured to re-encode the audio data stream and the video data stream based on characteristics of the second mobile computing device and deliver both the re-encoded audio data stream and the re-encoded video data stream to the second mobile computing device for synchronizing based on the respective audio and video timestamps.

2. The method of claim 1 further comprising causing a copy of the audio data stream and the video data stream to be archived.

3. The method of claim 1 wherein the second transport protocol is a reliable protocol.

4. The method of claim 2 wherein the copy of the audio data stream and the video data stream is archived as encoded by the first mobile computing device or as re-encoded by the centralized server.

5. The method of claim 3 wherein the second transport protocol is a transmission control protocol.

6. The method of claim 3 wherein the reliable protocol includes error correction done using the nearest available server.

7. The method of claim 3 wherein the first mobile computing device is a web device.

8. A computer implemented method performed by a centralized server for creating a two-way audio-video conversation between a first mobile computing device and a second mobile computing device, the method comprising:
    performing operations to handle processing tasks for real-time streaming of data for the two-way audio-video conversation at the centralized server on behalf of the first mobile computing device and the second mobile computing device including:
    receiving an audio data stream over a first transport protocol from the first mobile computing device, the audio data stream encoded with a first audio codec;
    receiving a video data stream communicated separately over a transmission control protocol from the first mobile computing device, the video data stream encoded with a first video codec, the transmission control protocol being different from the first transport protocol;

receiving codec data from the second mobile computing device, the codec data comprising a list of codecs installed on the second mobile computing device, the list of codecs comprising a second audio codec and a second video codec;

determining whether the list of codecs includes the first audio codec;

responsive to determining that the list of codecs does not include the first audio codec, transcoding the audio stream using the second audio codec;

determining whether the list of codecs includes the first video codec;

responsive to determining that the list of codecs does not include the first video codec, transcoding the video stream using the second video codec;

determining, by a bitrate adaptation module of the centralized server, whether to drop one or more frames from the received video data stream based, at least in part, on a bit rate limitation of the second mobile computing device and thereby cause lowering of processing requirements of the second mobile computing device relative to not dropping the one or more frames;

transmitting the audio data stream to the second mobile computing device over the first network protocol; and transmitting the video data stream separately from the audio data stream to the second mobile computing device over the second network protocol responsive to determining whether to drop the one or more frames from the received video data stream.

9. The method of claim 8 further comprising:
receiving feedback data from the second mobile computing device, the feedback data comprising a processing bandwidth, a network bandwidth, and latency data;
responsive to receiving the feedback data, adjusting the bit rate of the video data stream based on the processing bandwidth, the network bandwidth, and the latency data.

10. The method of claim 8 wherein at least one of the first and second mobile computing devices is a web device.

11. A computer implemented method performed by a centralized server for creating a two-way audio-video conversation between a first mobile computing device and a second mobile computing device, the method comprising:

performing operations for the two-way audio-video conversation at the centralized server on behalf of the first mobile computing device and the second mobile computing device including:

receiving an encoded audio data stream over a first transport protocol from the first mobile computing device, the encoded audio data stream comprising a stream of audio packets and an audio bit rate;

receiving an encoded video data stream communicated separately over a second transport protocol from the first mobile computing device, the encoded video data stream comprising a stream of video packets and a video bit rate;

receiving feedback data from the second mobile computing device, the feedback data comprising a network bandwidth and a processing bandwidth;

determining whether the sum of the audio bit rate and the video bit rate exceeds either the network bandwidth or the processing bandwidth;

responsive to determining that the sum of the audio bit rate and the video bit rate exceeds either the network bandwidth or the processing bandwidth, reducing, at the centralized server, the video bit rate of the encoded video data stream received from the first mobile computing device below the network bandwidth and the processing bandwidth;

transmitting the encoded audio data stream to the second mobile computing device over the first network protocol; and transmitting the encoded video data stream to the second mobile computing device over the second network protocol.

12. The method of claim 11 wherein reducing the video bit rate of the encoded video data stream comprises dropping selected packets from the stream of packets of the encoded video data stream.

13. The method of claim 11 wherein reducing the video bit rate of the encoded video data stream comprises down-converting the encoded video data stream to a lower quality.

14. The method of claim 11 further comprising:
receiving new feedback data from the second mobile computing device, the new feedback data comprising a new processing bandwidth, a new network bandwidth, and latency data;
responsive to receiving the new feedback data, adjusting the bit rate of the encoded video data stream based on the new processing bandwidth, the new network bandwidth, and the latency data.

15. The method of claim 11 wherein at least one of the first and second mobile computing devices is a web device.

16. A computer implemented method performed by a second mobile computing device for creating a two-way audio-video conversation between a first mobile computing device and the second mobile computing device, the method comprising:

receiving an audio data stream over a first transport protocol from a centralized server, the audio data stream comprising a stream of audio packets, each packet comprising an audio timestamp;

receiving a video data stream over a second transport protocol communicated separately from the centralized server, the video data stream comprising a stream of video packets, each packet comprising a video timestamp, the audio data stream and video data stream being maintained as split streams throughout communication from the first mobile computing device to the second mobile computing device and processed by the centralized server to offload processing operations for the two-way audio-video conversation to reduce latency;

buffering the audio and video data streams in a buffer;

synching the audio data stream with the video data stream, the synching comprising matching each audio timestamp and audio packet with a video timestamp and video packet; and if a matching video timestamp is present in the buffer:
outputting the synched audio data stream through an audio subsystem, the audio subsystem of the second mobile computing device being configured to decode the synched audio data stream; and outputting the synched video data stream through a video subsystem concurrently with outputting the synched audio data stream, the video subsystem of the second mobile computing device being configured to decode the synched video data stream.

17. The method of claim 16 further comprising:
monitoring the buffer; determining whether the buffer has exceeded a predetermined size; and responsive to determining that the buffer has exceeded the predetermined size, transmitting feedback data to the centralized server, the feedback data comprising a processing bandwidth and latency data.

18. The method of claim 16 wherein the second mobile computing device is a web device.

19. Apparatus at a first mobile computing device for creating a two-way audio-video conversation between the first mobile computing device and a second mobile computing device, the apparatus comprising:
an audio subsystem for recording an audio data stream and for encoding the audio data stream, the audio data stream comprising a stream of audio packets;
a video subsystem for receiving a video data stream and for encoding the video data stream, the video data stream comprising a stream of video packets;
components to maintain the audio data stream and video data streams for the two-way audio-video conversation as separate data streams and offload processing of the separate data streams to a centralized server for reduced latency, including:
a restore module for adding timestamps to the audio and video packets of the separate data streams, each audio packet comprising an audio timestamp and each video packet comprising a video timestamp matching a corresponding audio timestamp and audio packet that was recorded concurrently with the video packet;
an audio output for transmitting the audio data stream over a first transport protocol to the centralized server as one of said separate data streams; and
a video output for transmitting the video data stream separately from the audio data stream over a second transport protocol to the centralized server as another one of said separate data streams, the centralized server configured to re-encode the audio data stream or the video data stream based on characteristics of the second mobile computing device, process both the audio data stream and the video data stream as separate data streams, and deliver the separate data streams to the second mobile computing device for synchronizing based on the respective audio and video timestamps.

20. The apparatus of claim 19 wherein the first transport protocol is a low-latency protocol.

21. The apparatus of claim 19 wherein the second transport protocol is a reliable protocol.

22. The apparatus of claim 20 wherein the first transport protocol is a user datagram protocol.

23. The apparatus of claim 21 wherein the second transport protocol is a transmission control protocol.

24. The apparatus of claim 21 wherein the reliable protocol includes error correction done using the nearest available server.

25. Apparatus at a centralized server for creating a two-way audio-video conversation between a first mobile computing device and a second mobile computing device, the apparatus comprising:
means for performing operations for the two-way audio-video conversation on behalf of the first mobile computing device and the second mobile computing device including:
means for receiving an audio data stream over a first transport protocol from the first mobile computing device, the audio data stream encoded with a first audio codec;
means for receiving a video data stream separately from the audio data stream over a transmission control protocol from the first mobile computing device, the video data stream encoded with a first video codec;
means for receiving codec data from the second mobile computing device, the codec data comprising a list of codecs installed on the second mobile computing device, the list of codecs comprising a second audio codec and a second video codec;
means for determining whether the list of codecs includes the first audio codec;
means for transcoding the audio stream using the second audio codec, responsive to determining that the list of codecs does not include the first audio codec;
means for determining whether the list of codecs includes the first video codec;
means for transcoding the video stream using the second video codec, responsive to determining that the list of codecs does not include the first video codec;
means for determining, by a bitrate adaptation module of the centralized server, whether to drop one or more frames from the received video data stream based, at least in part, on a bit rate limitation of the second mobile computing device and thereby cause lowering of processing requirements of the second mobile computing device relative to not dropping the one or more frames;
means for transmitting the audio data stream to the second mobile computing device over the first network protocol; and means for transmitting the video data stream separately from the audio data stream to the second mobile computing device over the second network protocol responsive to determining whether to drop the one or more frames from the received video data stream.

26. The apparatus of claim 25 further comprising:
means for receiving feedback data from the second mobile computing device, the feedback data comprising a processing bandwidth, a network bandwidth, and latency data;
means for adjusting the bit rate of the video data stream based on the processing bandwidth, the network bandwidth, and the latency data, responsive to receiving the feedback data.

27. Apparatus at a centralized server for creating a two-way audio-video conversation between a first mobile computing device and a second mobile computing device, the apparatus comprising:
means for performing operations for the two-way audio-video conversation at the centralized server on behalf of the first mobile computing device and the second mobile computing device including:
means for receiving an encoded audio data stream over a first transport protocol from the first mobile computing device, the encoded audio data stream comprising a stream of audio packets and an audio bit rate;
means for receiving an encoded video data stream communicated separately from the audio data stream over a second transport protocol from the first mobile computing device, the encoded video data stream comprising a stream of video packets and a video bit rate;
means for receiving feedback data from the second mobile computing device, the feedback data comprising a network bandwidth and a processing bandwidth;
means for determining whether the sum of the audio bit rate and the video bit rate exceeds either the network bandwidth or the processing bandwidth;
means for reducing, at the centralized server, the video bit rate of the encoded video data stream received from the first mobile computing device below the network bandwidth and the processing bandwidth, responsive to determining that the sum of the audio bit rate and the video bit rate exceeds either the network bandwidth or the processing bandwidth;
means for transmitting the encoded audio data stream to the second mobile computing device over the first network protocol; and means for transmitting the encoded video data stream to the second mobile computing device over the second network protocol separately from the audio data stream.

28. The apparatus of claim 27 wherein means for reducing the video bit rate of the encoded video data stream comprises means for dropping selected packets from the stream of packets of the encoded video data stream.

29. The apparatus of claim 27 wherein means for reducing the video bit rate of the encoded video data stream comprises means for down-converting the encoded video data stream to a lower quality.

30. The apparatus of claim 27 further comprising:
means for receiving new feedback data from the second mobile computing device, the new feedback data comprising a new processing bandwidth, a new network bandwidth, and latency data; means for adjusting the bit rate of the encoded video data stream based on the new processing bandwidth, the new network bandwidth, and the latency data, responsive to receiving the new feedback data.

31. Apparatus at a second mobile computing device for creating a two-way audio-video conversation between a first mobile computing device and the second mobile computing device, the apparatus comprising:
an audio input for receiving an audio data stream from a centralized server over a first transport protocol, the audio data stream comprising a stream of audio packets, each packet comprising an audio timestamp;
a video input for receiving a video data stream communicated separately from the centralized server over a second transport protocol, the video data stream comprising a stream of video packets, each packet comprising a video timestamp, the audio data stream and video data stream being received as split streams that are maintained as split streams throughout communication from the first mobile computing device to the second mobile computing device and processed by the centralized server to offload processing operations for the two-way audio-video conversation for reduced latency;
a restore module for buffering the audio and video data streams in a buffer and synching the audio data stream with the video data stream, the synching comprising matching each audio timestamp and audio packet with a video timestamp and video packet;
an audio subsystem for outputting the synched audio data stream if a matching video timestamp is present in the buffer, the audio subsystem of the second mobile computing device being configured to decode the synched audio data stream; and
a video subsystem for outputting the synched video data stream concurrently with outputting the synched audio data stream if a matching video timestamp is present in the buffer, the video subsystem of the second mobile computing device being configured to decode the synched video data stream.

32. The apparatus of claim 31 further comprising:
the restore module monitoring the buffer and determining whether the buffer has exceeded a predetermined size; and
responsive to determining that the buffer has exceeded the predetermined size, transmitting feedback data to the centralized server, the feedback data comprising a processing bandwidth and latency data.

33. A computer-readable storage device with an executable program stored thereon, wherein the program instructs a microprocessor to perform the following steps at a first mobile computing device for creating a two-way audio-video conversation between the first mobile computing device and a second mobile computing device, the steps comprising:
recording an audio data stream;
encoding the audio data stream, the audio data stream comprising a stream of audio packets, each audio packet comprising an audio timestamp;
receiving a video data stream;
encoding the video data stream, the video data stream comprising a stream of video packets, each video packet comprising a video timestamp matching a corresponding audio timestamp and audio packet that was recorded concurrently with the video packet;
offloading to a centralized server processing of the audio data stream and video data stream for the two-way audio-video conversation between the first mobile computing device and the second mobile computing device by:
splitting the audio data stream and video data streams into separate data streams for communication to the centralized server;
transmitting the audio data stream over a first transport protocol to the centralized server; and
transmitting the video data stream over a second transport protocol to the centralized server, the video data stream and audio data stream maintained as separate streams during transmission to and from the centralized server, the centralized server configured to re-encode the audio data stream or the video data stream based on characteristics of the second mobile computing device and deliver both the audio data stream and the video data stream to the second mobile computing device for synchronizing the audio data stream and the video data stream based on the respective audio and video timestamps.

34. A computer-readable storage device with an executable program stored thereon, wherein the program instructs a microprocessor to perform the following steps for creating a two-way audio-video conversation between a first mobile computing device and a second mobile computing device, the steps comprising:
performing operations for the two-way audio-video conversation at a centralized server on behalf of the first mobile computing device and the second mobile computing device including:
receiving an audio data stream over a first transport protocol from the first mobile computing device, the audio data stream encoded with a first audio codec;
receiving a video data stream over a transmission control protocol from the first mobile computing device, the video data stream encoded with a first video codec;
receiving codec data from the second mobile computing device, the codec data comprising a list of codecs installed on the second mobile computing device, the list of codecs comprising a second audio codec and a second video codec;
determining whether the list of codecs includes the first audio codec;
responsive to determining that the list of codecs does not include the first audio codec, transcoding the audio stream using the second audio codec;
determining whether the list of codecs includes the first video codec;

responsive to determining that the list of codecs does not include the first video codec, transcoding the video stream using the second video codec;

determining, by a bitrate adaptation module of the centralized server, whether to drop one or more frames from the received video data stream based, at least in part, on a bit rate limitation of the second mobile computing device and thereby cause lowering of processing requirements of the second mobile computing device relative to not dropping the one or more frames;

transmitting the audio data stream to the second mobile computing device over the first network protocol for processing by the centralized server; and transmitting the video data stream to the second mobile computing device over the second network protocol for processing by the centralized server separately from the audio data stream responsive to determining whether to drop the one or more frames from the received video data stream.

35. A computer-readable storage device with an executable program stored thereon, wherein the program instructs a microprocessor of a centralized server to perform the following steps for creating a two-way audio-video conversation between a first mobile computing device and a second mobile computing device, the steps comprising:

performing operations for the two-way audio-video conversation at the centralized server on behalf of the first mobile computing device and the second mobile computing device including:

receiving an encoded audio data stream over a first transport protocol from the first mobile computing device, the encoded audio data stream comprising a stream of audio packets and an audio bit rate;

receiving an encoded video data stream over a second transport protocol from the first mobile computing device, the encoded video data stream comprising a stream of video packets and a video bit rate;

receiving feedback data from the second mobile computing device, the feedback data comprising a network bandwidth and a processing bandwidth;

determining whether the sum of the audio bit rate and the video bit rate exceeds either the network bandwidth or the processing bandwidth;

responsive to determining that the sum of the audio bit rate and the video bit rate exceeds either the network bandwidth or the processing bandwidth, reducing, at the centralized server, the video bit rate of the encoded video data stream received from the first mobile computing device below the network bandwidth and the processing bandwidth;

adapting at the centralized server one or more of the audio data stream or video data stream into byte packages that meet a maximum transfer unit (MTU) requirement associated with a wireless network carrier used for the two-way audio-video conversation;

transmitting the adapted audio data stream to the second mobile computing device over the first network protocol; and transmitting the adapted video data stream to the second mobile computing device over the second network protocol.

36. A computer-readable storage device with an executable program stored thereon, wherein the program instructs a microprocessor to perform the following steps at a second mobile computing device for creating a two-way audio-video conversation between a first mobile computing device and the second mobile computing device, the steps comprising:

receiving an audio data stream over a first transport protocol, the audio data stream comprising a stream of audio packets, each packet comprising an audio timestamp;

receiving a video data stream over a second transport protocol, the video data stream comprising a stream of video packets, each packet comprising a video timestamp, the audio data stream and video data stream received from a centralized server as separate streams and maintained as the separate streams throughout communication from the first mobile computing device to the second mobile computing device, the centralized server configured to perform operations on the separate streams to offload processing for the two-way audio-video conversation, at least one of the streams being adjusted at the centralized server to have byte packages that meet a maximum transfer unit (MTU) requirement associated with a wireless network carrier used for the two-way audio-video conversation;

buffering the audio and video data streams in a buffer;

synching the audio data stream with the video data stream, the synching comprising matching each audio timestamp and audio packet with a video timestamp and video packet;

if a matching video timestamp is present in the buffer:

outputting the synched audio data stream through an audio subsystem, the audio subsystem of the second mobile computing device being configured to decode the synched audio data stream; and outputting the synched video data stream concurrently with outputting the synched audio data stream, the video subsystem of the second mobile computing device being configured to decode the synched video data stream.

* * * * *